United States Patent [19]
Kittle et al.

[11] 3,785,157
[45] Jan. 15, 1974

[54] FLOW CONTROL DUMP VALVE

[75] Inventors: Carl Edwin Kittle; Seaton Moon, both of Cedar Falls; Keith Louis Spencer, Waterloo, all of Iowa

[73] Assignee: Deere & Company, Moline, Ill.

[22] Filed: Nov. 24, 1972

[21] Appl. No.: 309,365

[52] U.S. Cl. .................... 60/493, 60/494, 192/85, 92/172, 92/186, 60/456
[51] Int. Cl. ............................................. F16h 39/02
[58] Field of Search .................. 60/494, 453, 435, 60/455, 493; 91/45, 49; 92/172, 186; 137/117, 513.3; 192/85 AA, 85 A

[56] References Cited
UNITED STATES PATENTS
| | | | |
|---|---|---|---|
| 2,614,396 | 10/1952 | Ratermann | 192/85 AA X |
| 2,869,701 | 1/1959 | Yokel | 192/85 AA X |
| 2,929,212 | 3/1960 | Lewis et al. | 60/453 |

Primary Examiner—Edgar W. Geoghegan
Attorney—H. Vincent Harsha et al.

[57] ABSTRACT

The wheel motor of a hydrostatic drive system is coupled to the wheel through a pressure responsive clutch which disconnects the motor from the wheel during periods when fluid under pressure is not supplied to the motor. A flow control dump valve is built into the clutch actuator and regulates a specific rate of flow through the actuator from zero to lock-up pressure. The flow control dump valve blocks all flow through the actuator above lock-up pressure. The flow control dump valve provides a controlled bleed for purging of air and sumping of oil which leaks past the control valve below lock-up pressure. The sumping of oil below lock-up pressure ensures complete release of the clutch when fluid pressure is not supplied to the motor.

7 Claims, 5 Drawing Figures

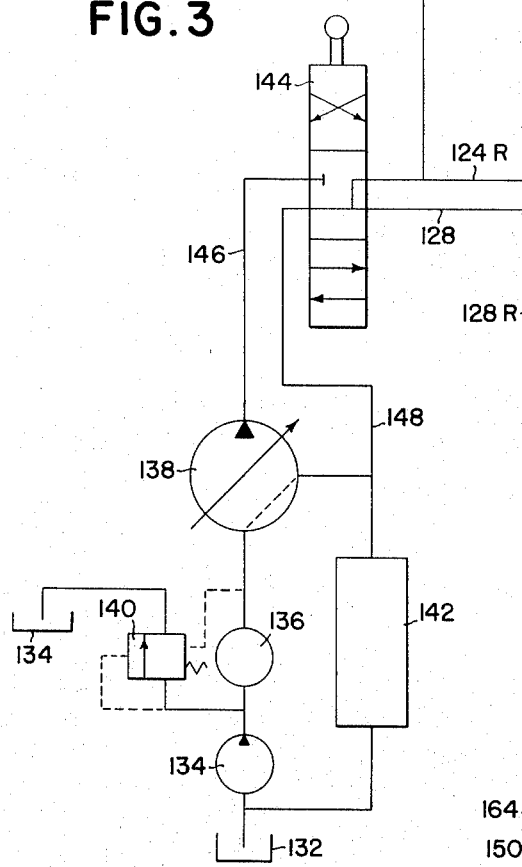
FIG. 3
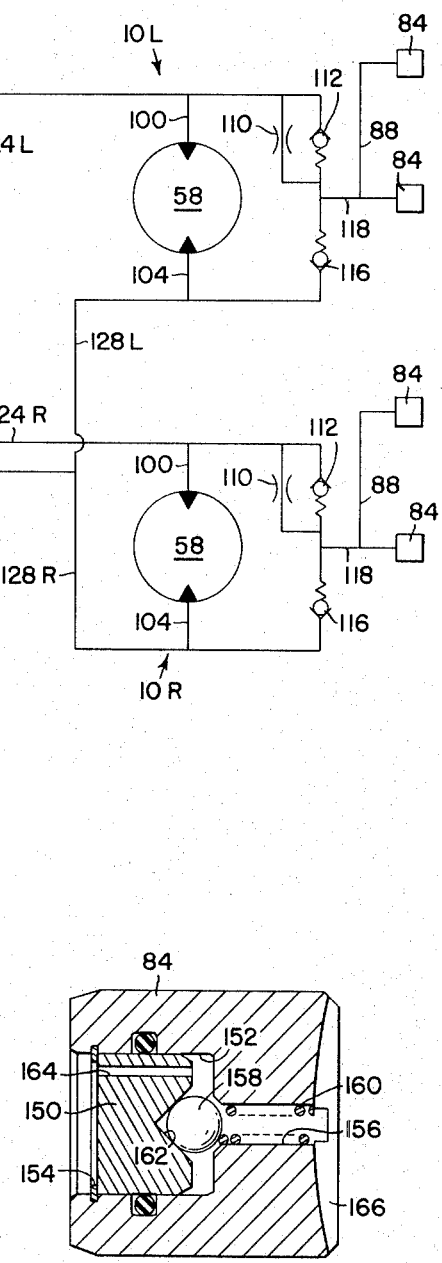
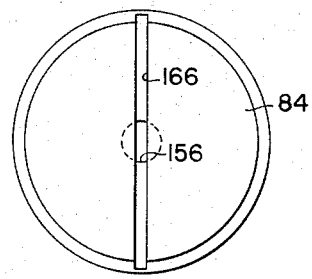
FIG. 5
FIG. 4

FLOW CONTROL DUMP VALVE

BACKGROUND OF THE INVENTION

The present invention relates generally to the art of hydraulics and more specifically relates to a flow controlled dump valve which provides a controlled bleed in a hydraulic system permitting purging of air and/or sumping of oil which leaks past a control valve below lock-up pressure while maintaining zero flow above lock-up pressure.

In many hydraulic circuits, there are times when it is desirable that all pressure be relieved from the system. An example of such a hydraulic system would be the hydrostatic front wheel drive system described, illustrated and claimed in U. S. Pat. No. 3,458,005 which issued to D. I. Malm et al. on July 29, 1969. In the hydrostatic wheel drive system illustrated therein, the hydraulic motor is connected to the wheel through a system pressure responsive clutch which is designed to disconnect the motor and wheel during periods when fluid pressure is not supplied to the motor. However, as illustrated in the patent, the motor and clutch are connected to a charge pump whenever they are disconnected from the main pump of the system. The low pressure of the charge pump acts on the clutch actuators to provide a small clamp-up force which causes a small drag on the clutch components. In such a system, it is desirable to relieve all pressure from the clutch actuator so that there is no drag on the clutch components during periods of nonuse.

Also, many hydraulic systems require occasional bleeding to purge air from the system, and very few systems have a convenient method of purging the air.

SUMMARY OF THE INVENTION

The principal object of the present invention is to provide a flow control dump valve for a hydraulic system which will regulate a rate of flow of fluid from the system through the valve until a predetermined pressure drop is obtained across the valve at which time the valve will prevent the flow of fluid from the system.

Another important object of the present invention is to provide a valve for use in a hydraulic system which serves as a controlled bleed in the system permitting purging of air and/or sumping of oil from the system when the pressure acting on the valve is below a predetermined lock-up pressure while maintaining zero flow of fluid from the system above the predetermined lock-up pressure.

Another object of the present invention is to provide a flow controlled dump valve for hydraulically applied brakes and/or clutches which provides a controlled bleed from the brake and/or clutch hydraulic system during periods when the brake applied to the brake and/or clutch actuator is below a predetermined value and prevents the bleeding of fluid from the system when the pressure applied to the actuator for the brake and/or clutch is above the predetermined value.

Yet another object of the present invention is to provide a flow controlled dump valve which is built into the hydraulic actuator for the brake and/or clutch and which permits the bleeding of fluid through the actuator when the hydraulic pressure applied to the actuator is below a predetermined value and which prevents the bleeding of fluid through the actuator when the pressure applied to the actuator is above the predetermined value.

The above objects and additional objects and advantages of the present invention will become apparent to those skilled in the art from a reading of the following detailed description when taken in conjunction with the accompanying drawings.

BRIEF DESCRIPTION OF THE DRAWINGS

In the drawings:

FIG. 3 is a schematic illustration of a hydrostatic wheel drive system;

FIG. 4 is a sectional view through one of the clutch actuators of the hydrostatic wheel drive and hydrostatic wheel drive system illustrated in FIGS. 1 and 3, and illustrating the flow control dump valve according to the present invention; and FIG. 5 is an end view of the clutch actuator illustrated in FIG. 4.

DESCRIPTION OF THE PREFERRED EMBODIMENT

Figure 1:
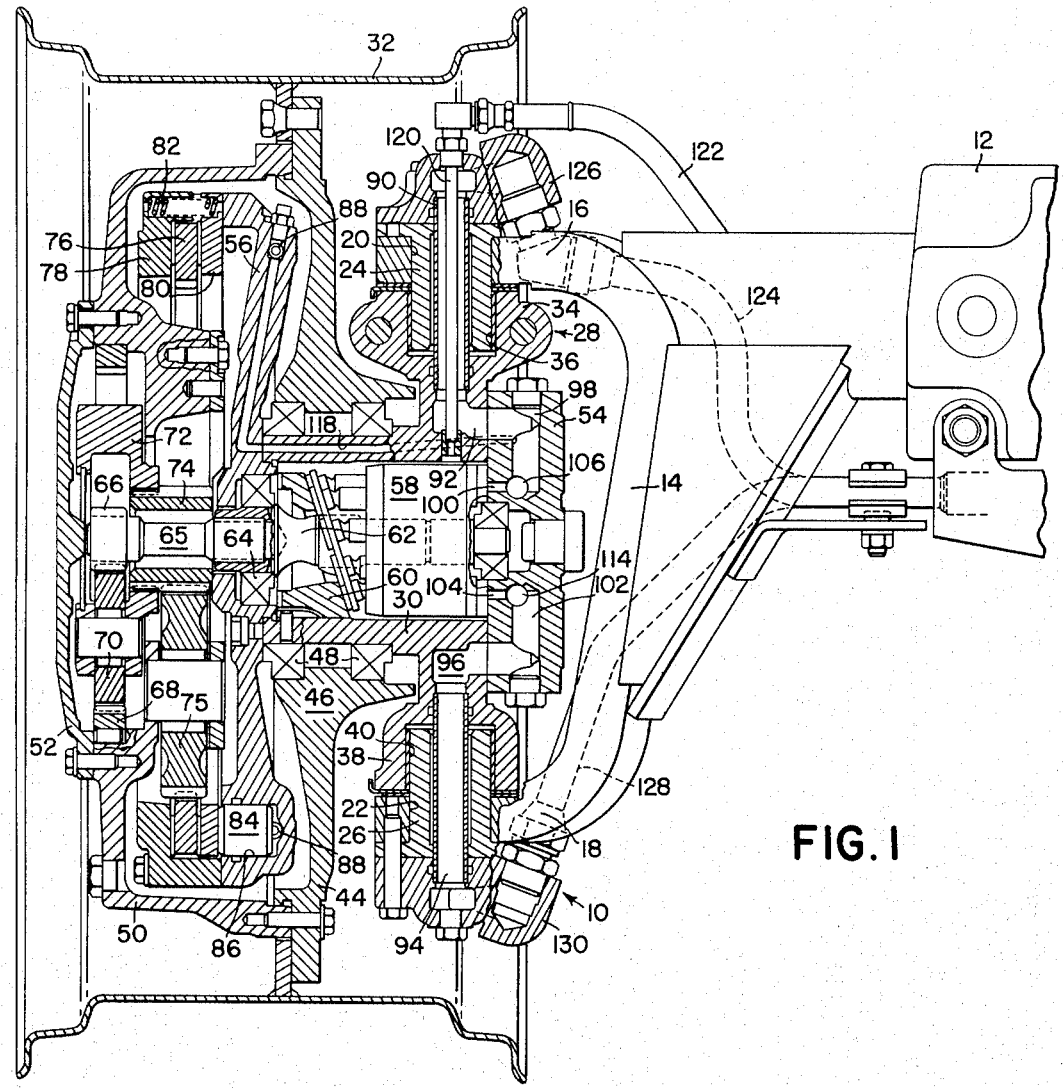
FIG. 1 is a sectional view taken along the axis of a hydrostatic wheel drive unit.

For the purpose of illustrating one use and describing the operation of the flow control dump valve according to the present invention, it is illustrated as incorporated in a hydrostatic wheel drive unit indicated generally at 10. The wheel unit 10 is mounted on an axle 12 provided with a yoke 14 at its end, the yoke 14 having upper and lower vertically aligned arms 16 and 18 which are provided with upright coaxial bores 20 and 22, respectively. A cylindrical pin 24 is mounted in and extends downwardly from the upper arm bore 20 and a similar pin 26 is mounted in and extends upwardly from the lower arm bore 22. Mounted on the pins 24 and 26 for rocking about the vertical axis of the pins is an end portion 28 of the front axle structure, the end portion including a hollow drum-like housing 30 which is generally coaxial with a wheel rim 32 and lies generally in the same vertical plane as the wheel rim 32. The end portion 28 also includes an upper projection 34 which extends in a generally radial direction relative to the housing 30 and includes an upright, bearing lined bore 36 adapted to receive the upper pin 24. A similar projection 38 extends downwardly from the housing 30 and includes an upright, bearing lined bore 40 adapted to receive the lower pin 26. Movement of the end portion 28 of the axle structure about the axis of the pins 24 and 26 is accomplished through a conventional steering mechanism which operates on a crank arm 42 secured to the upper projection 34.

The wheel unit 10 includes a radial portion 44 which is secured to the rim 32 and has a hub 46 journaled on bearings 48 which in turn are mounted on the cylindrical outer surface of the housing 30. A large drum-like member 50 which is closed in the direction away from the axle by a cap 52 is coaxially secured to the radial portion 44 to form a closed cylindrical cavity in conjunction with the radial portion 44 and the housing 30.

The inner end of the housing 30 is closed by a cap member 54 and the opposite or outer end of the housing 30 is closed by a drum-like member 56 which is coaxially bolted to the housing 30 and has its open side facing the drum member 50.

A fixed displacement, axial piston-type hydraulic motor is mounted in the housing 30 and includes a fixed swash plate 60 and a cylinder barrel 58 which is mounted on and keyed or splined to an outwardly extending output shaft 62 supported in a bearing 64 mounted in an axial opening in the member 56. The output shaft 62 is connectible to the wheel rim 32 by a compound planetary gear train which includes a shaft 65 splined to the output shaft 62 and carrying an integral first sun gear 66, a ring gear 68 and a plurality of planetary pinions 70 constantly meshing with the sun gear 66 and the ring gear 68 and journaled on a planetary carrier 72. The planetary carrier 72 meshes with a second sun gear 74 positioned around the shaft 65. The second sun gear 74 engages a plurality of planetary pinions 75 which in turn engage a second ring gear 76. The ring gear 76 is engageable with an annular member 78 coaxially attached to the member 56, the engagement being accomplished by a hydraulically actuated clutch including an annular clutch plate 80 biased away from the ring 76 by a plurality of clutch springs 82. The clutch plate 80 is axially shiftable against the bias of the springs to compress the ring gear 76 against the member 78 by a plurality of hydraulically actuated clutch pistons 84 shiftable in cylinders 86 in response to fluid pressure in the cylinders, the fluid pressure being supplied to the cylinders through a clutch pressure passage 88 formed in the member 56. Although only a single clutch actuating piston is shown in FIG. 1, a plurality of such pistons are spaced at equiangular intervals around the member 56.

The upper pin 24 is provided with an axial passage 90 which communicates with a passage 92 in the housing 30. Similarly, the pin 26 is provided with an axial passage 94 communicating with a passage 96 in the housing 30. The upper housing passage 92 has an axially extending portion which communicates with an inlet passage 98 in the cap member 54 which is in turn connected to a kidney-shaped motor inlet port 100 which communicates with the cylinder ports in the cylinder barrel 58 in the conventional manner. Similarly, the passage 96 in the housing 30 is connected to a passage 102 in the cap member 54 and the passage 102 in turn is connected to a kidney-shaped port 104 which communicates with the cylinder ports in the cylinder 58 in the conventional manner.

Figure 2:
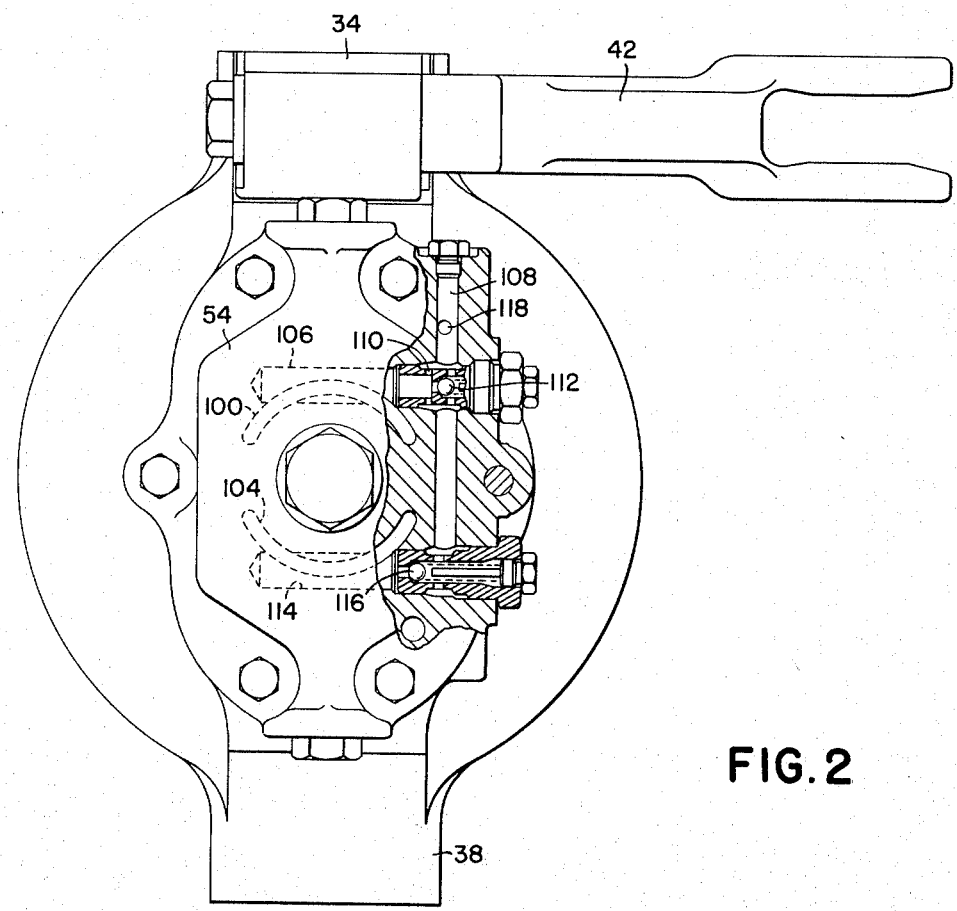
FIG. 2 is an end view of the motor housing of the hydrostatic wheel drive unit illustrated in FIG. 1, parts being broken away to illustrate internal passages.

Connected to the inlet passage 98 is a passage 106 which communicates with a vertical passage 108. As can be seen in FIG. 2, the flow of fluid between the passages 106 and 108 is restricted by an orifice 110, but a spring-loaded check valve 112 permits fluid flowing from the passage 106 to the passage 108 to bypass the orifice 110. A passage 114 connects the passage 102 with the vertical passage 108 through a spring-loaded check valve 116 which prevents the flow of fluid from the vertical passage 108 to the passage 114. The springs for the check valves 112 and 116 are preferably sufficiently heavy to maintain the check valves closed when the valves are subjected to charge pressure. The vertical passage 108 is connected to the clutch pressure passage 88 by a passage 118 which extends through the housing 30.

Coaxially mounted in the passage 90 in the upper pin 24 is a drain tube 120 which also extends through the wall of the housing 30 into the interior of the housing, the outer end of the drain tube 120 being connected to an oil return line 122 so that leakage of oil from the motor is not trapped within the housing but is rather returned to the reservoir of the hydraulic system. The passage 90 is connected to a fluid line 124 by a suitable fitting 126 and the passage 94 is connected to a fluid line 128 by a suitable fitting 130.

Two of the wheel units 10 will be used on a typical vehicle and will be connected to a hydraulic system such as that illustrated in FIG. 3. As shown in FIG. 3, the hydraulic system includes a fluid reservoir 132, a charge pump 134 which delivers fluid from the reservoir 132 through a filter 136 to a main variable displacement constant pressure pump 138 at a relatively low pressure. The filter 136 is protected by a relief valve 140 and fluid which is delivered to the pump 138 but not used by the pump 138 is returned to the reservoir 132 through a cooler 142. The output of the main pump 138 is connected to one side of a main control valve 144 by a fluid line 146. The one side of the control valve is also connected via a fluid line 148 and the cooler 142 to the reservoir 132. The second side of the valve 144 is connected to the fluid lines 124 and 128 leading to the wheel units 10.

The wheel units 10 and hydraulic system thus far described are substantially the same as that described and illustrated in U. S. Pat. No. 3,458,005 which issued to Malm et al. on July 29, 1969, and operates substantially as follows. When the hydrostatic drive system is to be used as an aid in propelling a vehicle on which it is mounted, the valve 144 is moved from the neutral position illustrated in FIG. 3 to connect the fluid line 146 to either the fluid lines 124 of the wheel units 10 or the fluid line 126 to the fluid lines 128 of the wheel units 10. As can be seen in FIG. 3, when the fluid line 146 is connected to the fluid lines 124, the fluid lines 128 are connected to the reservoir 132 through the fluid line 148 and the cooler 142, and when the fluid line 146 is connected to the fluid lines 128, the fluid lines 124 are connected to the reservoir through the fluid line 148 and the cooler 142. The fluid pressure delivered to the wheel units will cause rotation of the cylinder barrel 58 which drives the wheel rims 32 through the output shaft 62 and the compound planetary gear train. When fluid pressure is delivered to the wheel units, it is also routed to the clutch actuators 84 through the fluid passages 88 and 118.

As can be seen in FIG. 3, when the valve 144 is in the neutral position, the fluid lines 124 and 128 are all connected to the reservoir 132 through the fluid line 148 and cooler 142. However, since the charge pump 134 is continuously circulating fluid through the filter 136, main pump 138 and cooler 142, there is a small pressure buildup on the intake of the cooler 142 and this pressure buildup is passed through the fluid lines 148, 124, 128, 118 and 88 and acts on the clutch actuators 84. This small pressure leaks through the orifice 110 and acts on the clutch actuators 84 to create a small drag on the vehicle when the vehicle is driven by the conventional mechanical transmission and the wheel units 10 are forced to rotate. According to the present invention, this pressure acting on the clutch actuators 84 when the wheel units 10 are disconnected from the main pump 138 is alleviated by flow controlled dump valves which are machined into the pistons 84 of the clutch actuators as illustrated in FIG. 4.

The flow controlled dump valves include a secondary piston 150 which is slidably mounted in a cylinder 152 formed in the piston 84. The piston 150 is retained in the cylinder 152 by a snap ring 154. The cylinder 152 is open to one end of the piston 84 and communicates with the opposite end of the piston 84 through a passage 156. The inner end of the passage 156 forms a valve seat which receives a ball 158. The ball 158 is normally biased away from the seat 158 and against the inner end of the piston 150 by a spring 160. The piston 150 is provided with a recessed area 162 at its inner end and receives the ball 158 in the recess 162 to retain the ball in alignment with the valve seat. The piston 150 is also provided with a small through passage 164 which provides for limited flow of fluid from one end of the cylinder 152 to the other. The piston 84 is provided with a slot 166 at its inner end, and the slot 166 functions to permit flow of fluid through the passage 156 when the inner end of the piston 84 is in engagement with the clutch plate 80.

The flow controlled dump valve relieves the pressure acting on the pistons 84 during periods when the wheel units are disconnected from the main pump by permitting fluid to flow through the passage 164, between the ball 158 and valve seat, through the passage 156 and slot 166 into the housing for the compound planetary gear train. The fluid in the housing for the gear train is returned to sump through a clearance between the shaft 62 and member 56, the bearing 64, the pump housing 30, relief tube 120 and fluid line 122.

When the wheel units 10 are connected to the main pump 138, fluid pressure from the pump 138 acts on the pistons 84 and this pressure is sensed by the flow controlled dump valve to regulate a specific rate of flow through the dump valve until the pressure at the pistons 84 reaches a predetermined value or a lock-up pressure. When the pressure at the pistons 84 reaches the lock-up pressure, the flow controlled dump valves prevent flow through the pistons 84 in the following manner. As the pressure acting on the outer end of the piston 150 increases, the pressure drop across the dump valve increases until the pressure differential on opposite sides of the piston 150 acts through the piston 150 against the ball 158 to move the ball 158 towards the valve seat. As the ball 158 moves towards the valve seat, it restricts the passage of fluid between the ball and valve seat so that pressure builds up in the chamber formed by the inner end of the piston 150 and the cylinder 152. The pressure buildup in the chamber formed by the inner end of the piston 150 and the cylinder 152 causes the pressure drop across passage 164 to remain substantially constant until lock-up pressure is reached while pressure drop across the passage between the ball and valve seat increases. This pressure on the inner end of piston 150 opposes the pressure on the outer end of the piston 150, but also acts on the ball 158 to force the ball 158 against the spring 160 and towards the valve seat. As the pressure acting on the pistons 84 increases, it continues to move the ball 158 closer to the valve seat in the manner described until the fluid pressure within the chamber formed by the inner end of the piston 150 and the cylinder 152 is sufficient to hold the ball 158 against the valve seat. At this time, the flow of fluid through the passage 156 is prevented as long as the pressure acting on the pistons 84 and the ball 158 is sufficient to maintain the ball 158 against its seat.

When the valve 144 is moved to its neutral position illustrated in FIG. 3, the pressure acting against the pistons 84 drops causing a drop within the chamber formed by the inner end of the piston 150 and the cylinder 152 so that the fluid pressure acting on the ball 158 is insufficient to retain the ball against its seat. Fluid is then permitted to flow through the passage 156 so that the fluid pressure within the chamber formed by the inner end of the piston 150 and the cylinder 152 is reduced even further.

In addition to relieving the pressure acting against the pistons 84 during periods when the wheel units are disconnected from the pump 138, the flow controlled dump valve, by permitting a controlled bleed through the hydraulic system, automatically purges any air which may be trapped within the system.

Having thus described a single preferred embodiment of the invention, various changes and modifications within the spirit and scope of the invention will become apparent to those skilled in the art and can be made without departing from the underlying principles of the invention. Therefore, the invention should not be limited by the specific illustration and description, but only by the following claims.

We claim:

1. In a hydraulic circuit including a pump, a hydraulic function, and hydraulic circuit means interconnecting the pump and function and including valve means for selectively blocking fluid flow from the pump to the function, means for bleeding fluid from the hydraulic circuit means between the function and valve when fluid flow is blocked from the pump to the function comprising: restricted passage means in communication with the circuit means between the function and valve normally providing limited fluid flow from the circuit means to a reservoir, and flow controlled valve means associated with the restricted passage means responsive to a predetermined pressure drop less than the pressure normally supplied to the function by the pump across the restricted passage means to block the flow of fluid through the restricted passage means whereby the flow controlled valve means prevents bleeding of fluid from the circuit means when fluid under pressure from the pump is supplied to the function.

2. The invention as set forth in claim 1 wherein the hydraulic function includes a movable piston member, the restricted passage means extends through the movable piston member, and the flow controlled valve means is located within a chamber provided in the movable piston member.

3. The invention as set forth in claim 2 wherein the chamber provided in the movable piston member is cylindrical and has one end open to the circuit means, fluid passage means extends from the second end of the chamber to a fluid reservoir, a secondary piston is mounted in the chamber for limited reciprocal movement, a ball member is positioned in the chamber between the second end thereof and the secondary piston for engagement with a valve seat formed by the juncture between the chamber and fluid passage means, spring means normally urge the ball member away from the seat into engagement with the secondary piston, and a small bore extends through the secondary piston from one end thereof to the other.

4. For use in a hydraulic circuit including a pump, a hydraulic function, and a directional flow control valve between the pump and function, a flow controlled dump valve comprising: a valve body having a cylindrical chamber therein with one end open to the hydraulic circuit between the function and directional flow control valve; fluid passage means extending from a second end of the chamber to a fluid reservoir; the juncture between the chamber and fluid passage means forming a valve seat; a piston reciprocally mounted in the chamber; a ball valve member in the chamber between the piston and valve seat; yieldable force-applying means normally urging the ball valve member away from the seat into engagement with the piston; and a restricted fluid passageway provided through the piston to permit limited fluid flow from the first end of the chamber to the second end of the chamber.

5. The invention as set forth in claim 4 wherein the hydraulic function includes a movable piston member and the movable piston member forms the valve body.

6. In a piston for applying brakes and clutches and having a first fluid pressure receiving end and a second clamp-up end, the improvement comprising: a cylindrical chamber provided in the piston open to the first end; a fluid passage provided in the piston interconnecting the cylindrical chamber and the second end of the piston; the juncture between the chamber and passage forming a valve seat; a secondary piston slidably mounted in the cylindrical opening; a restricted passage provided through the secondary piston from one end thereof to the other; a ball valve member in the chamber between the secondary piston and the valve seat; and yieldable force-applying means acting on the ball valve member to normally force the ball valve member off the seat and against the secondary piston.

7. The invention as set forth in claim 6 wherein the secondary piston includes means cooperating with the ball valve member to retain the ball valve member in alignment with the seat.

* * * * *